US011498801B2

(12) United States Patent
Derbarmdiger

(10) Patent No.: US 11,498,801 B2
(45) Date of Patent: Nov. 15, 2022

(54) ELEVATOR

(71) Applicant: Shmuel Derbarmdiger, Jerusalem (IL)

(72) Inventor: Shmuel Derbarmdiger, Jerusalem (IL)

(73) Assignee: Shmuel Derbarmdiger, Jerusalem (IL)

( * ) Notice: Subject to any disclaimer, the term of this patent is extended or adjusted under 35 U.S.C. 154(b) by 969 days.

(21) Appl. No.: 16/169,574

(22) Filed: Oct. 24, 2018

(65) Prior Publication Data
US 2019/0127177 A1    May 2, 2019

(30) Foreign Application Priority Data

Oct. 24, 2017 (IL) .......................................... 255248

(51) Int. Cl.
| | |
|---|---|
| *B66B 1/26* | (2006.01) |
| *B66B 9/04* | (2006.01) |
| *B66B 1/34* | (2006.01) |
| *B66B 13/14* | (2006.01) |
| *B66B 5/00* | (2006.01) |
| *B66B 11/04* | (2006.01) |

(52) U.S. Cl.
CPC .............. *B66B 1/26* (2013.01); *B66B 1/3415* (2013.01); *B66B 1/3492* (2013.01); *B66B 5/0018* (2013.01); *B66B 9/04* (2013.01); *B66B 11/043* (2013.01); *B66B 11/0423* (2013.01); *B66B 13/14* (2013.01)

(58) Field of Classification Search
CPC ....... B66B 1/26; B66B 1/3415; B66B 1/3492; B66B 5/0018; B66B 9/04; B66B 11/0423; B66B 11/043; B66B 13/14; B66B 1/04; B66B 1/3407; B66B 1/3469

USPC ......................................................... 187/272
See application file for complete search history.

(56) References Cited

U.S. PATENT DOCUMENTS

| | | | |
|---|---|---|---|
| 4,785,915 A | 11/1988 | Shah et al. | |
| 5,346,038 A * | 9/1994 | Rehfeld | .................... B66B 9/04 |
| | | | 187/273 |
| 10,611,600 B2 * | 4/2020 | Morrison | ................ F15B 11/04 |
| 10,669,128 B2 * | 6/2020 | Robbins-Capuano | ....................... |
| | | | B66B 5/028 |

(Continued)

FOREIGN PATENT DOCUMENTS

| | | |
|---|---|---|
| CN | 102167253 A | 8/2011 |
| CN | 102502377 A | 6/2012 |

(Continued)

*Primary Examiner* — Jeffrey Donels
(74) *Attorney, Agent, or Firm* — Dorsey & Whitney LLP

(57) ABSTRACT

A pressurized fluid powered cabin-management system for an elevator system with a cabin and drive system is provided. The cabin-management system is configured to direct operation of the elevator system upon arrival of one of the cabins at a floor, and comprises a floor detector configured to detect when the cabin is located at a floor and to activate a timer. The timer is configured, when triggered, to activate a timing arrangement and to pass pressurized fluid to a control valve being in a first position. The timing arrangement is configured to direct the control valve to assume a second position after a predetermined amount of time. The cabin-management system performs, when pressurized fluid is passed to the control valve in its first position, actions for opening a door, and, after the control valve has assumed its second position, actions for travel of the cabin.

19 Claims, 8 Drawing Sheets

(56) References Cited

U.S. PATENT DOCUMENTS

| | | | |
|---|---|---|---|
| 2013/0126277 A1* | 5/2013 | Friedman | B66B 3/00 187/384 |
| 2014/0174860 A1* | 6/2014 | Yakuel | B66B 9/04 187/272 |
| 2014/0364272 A1* | 12/2014 | Shapira | B66B 11/0484 477/3 |
| 2019/0092602 A1* | 3/2019 | Harel | B66B 5/0025 |
| 2019/0127177 A1* | 5/2019 | Derbarmdiger | B66B 1/26 |
| 2020/0262677 A1* | 8/2020 | Samba Murthy | F15B 11/10 |

FOREIGN PATENT DOCUMENTS

| | | |
|---|---|---|
| CN | 103482455 A | 1/2014 |
| IL | 122745 A | 10/1998 |
| IL | 221842 | 2/2013 |
| WO | 15019357 A1 | 2/2015 |
| WO | 2017013709 A1 | 1/2017 |

\* cited by examiner

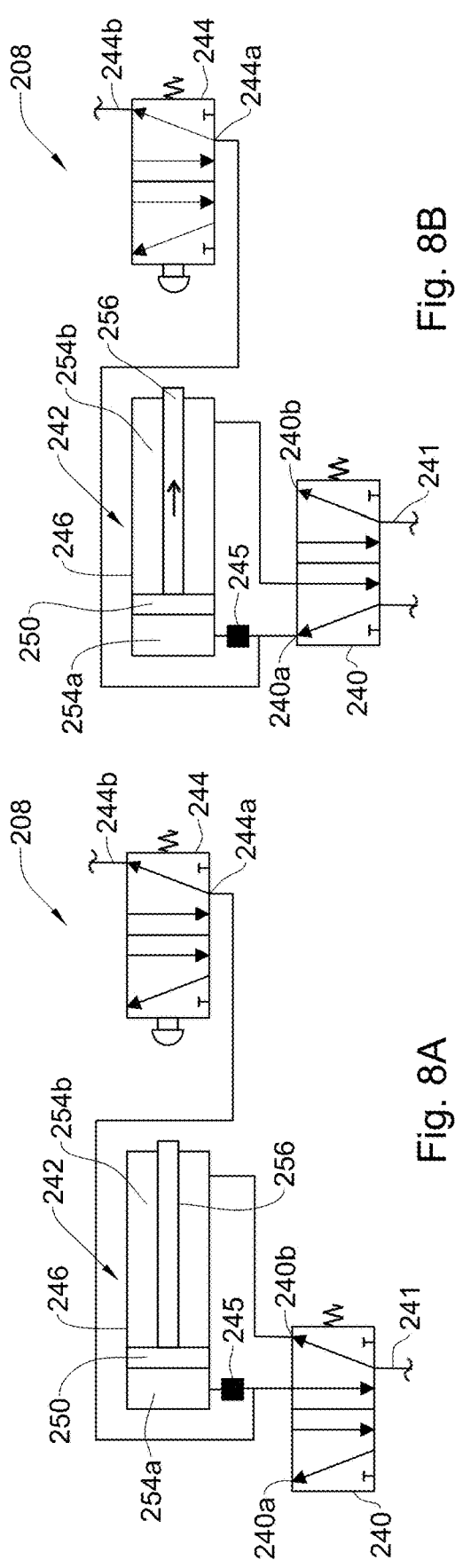
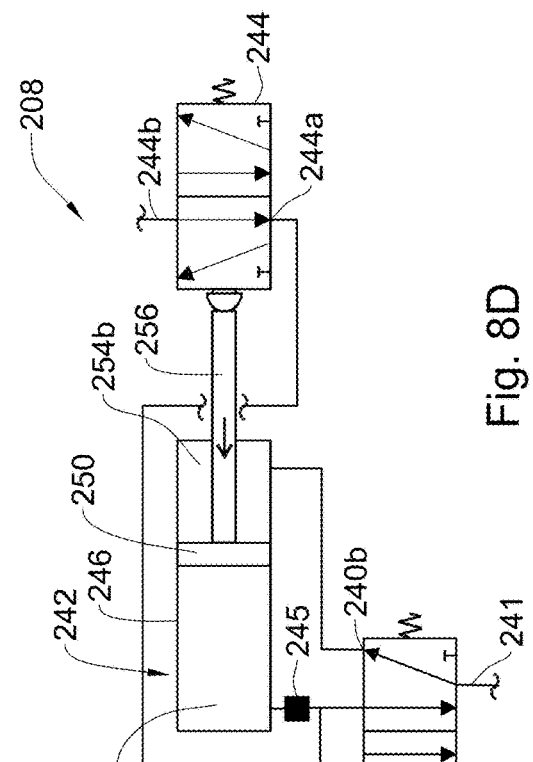
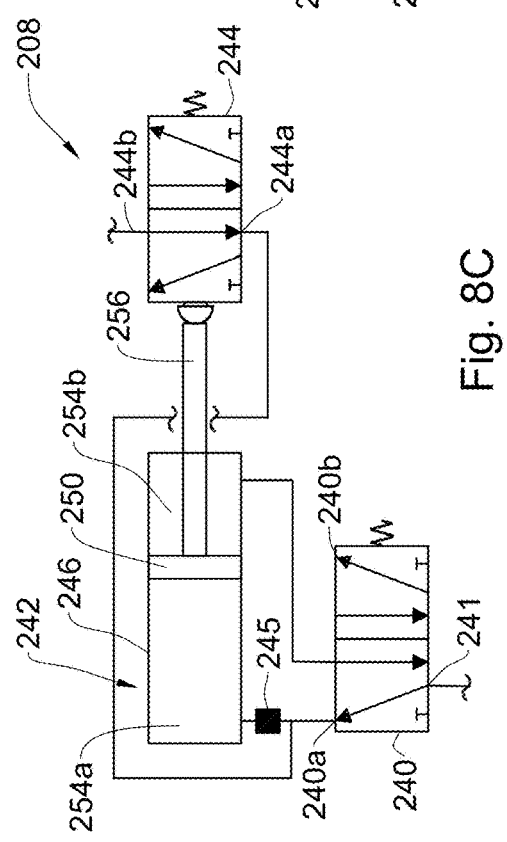
Fig. 8A  Fig. 8B  Fig. 8C  Fig. 8D

ELEVATOR

TECHNOLOGICAL FIELD

The present disclosure relates to personnel elevators, and in particular to personnel elevators which are driven by pressurized fluids, such as hydraulic power.

BACKGROUND

Elevator systems are provided in nearly all modern buildings which comprise several stories or more, in order to facilitate people to easily travel between floors. Typical elevator systems comprise, inter alia, a passenger cabin, which travels between floors under the power of an electric motor, and an electronic system which facilitates calling a cabin to a particular floor, directing the cabin to a particular floor, etc.

Individuals who strictly adhere to Orthodox Jewish practice often do not use standard elevators on the Jewish Sabbath and some holidays, as the use of electricity is generally restricted on such days. Accordingly, they often are limited to living on the lower floors of a building (which are more conveniently accessible by stairs), or using a specially designed elevator system which limits the interaction between the users and electric and/or electronic components. Some follow a stricter interpretation of Orthodox Jewish practice, according to which the user must have no effect on the amount of electricity consumed, and thus may be restricted from using even elevator systems which other practitioners of Orthodox Jewish utilize.

SUMMARY

According to one aspect of the presently disclosed subject matter, there is provided a cabin-management system for an elevator system, the elevator system comprising at least one cabin and a drive system configured to facilitate travel of the cabin between two or more floors, the cabin-management system being operated using pressurized fluid, which may be a hydraulic fluid, and configured to autonomously direct operation of the elevator system upon arrival of one of the cabins at a floor, the cabin-management system comprising a floor detector configured to detect when the cabin is located at a floor and a timer configured to be triggered thereby;

the timer being configured, when triggered, to activate a timing arrangement and to pass pressurized fluid to a control valve being in a first position;

the timing arrangement being configured, a predetermined amount of time after being activated, to direct the control valve to assume a second position;

the cabin-management system being configured to perform, when pressurized fluid is passed to the control valve in its first position, one or more actions associated with opening a door to the cabin, and to perform, after the control valve has assumed its second position, one or more actions associated with resumed travel of the cabin.

The cabin-management system may be free of any electric components.

In the first position of the cabin-management system, the control valve may be open, and in its second position, the control valve may be closed.

The cabin-management may further comprise an auxiliary control valve configured, in an active position thereof, to pass the pressurized fluid to the control valve and to the timing arrangement, thereby activating it, and in a closed position thereof to prevent pressurized fluid from flowing to the control valve. The floor detector may be configured to direct the auxiliary control valve to assume the active position, thereby triggering the timer.

The timing arrangement may comprise a pressurized-fluid cylinder configured to extend when the timing element is activated, and a flow control valve configured to regulate the flowrate of pressurized fluid thereto, wherein the flowrate determines the predetermined amount of time.

The pressurized-fluid cylinder may be configured, when fully extended, to activate the control valve to assume its second position.

The actions associated with opening a door to the cabin may comprise one or more selected from a group including applying brakes, deploying a mechanical securing mechanism, and opening the door. The cabin-management system may be configured to open the door only after the brakes have been applied and/or the mechanical securing mechanism has been deployed. The cabin-management system may be configured such that the mechanical securing mechanism is deployed after the brakes have been applied.

The actions associated with resumed travel of the cabin may comprise one or more selected from a group including disengaging brakes, disengaging a mechanical securing mechanism, and closing the door. The cabin-management system may be configured to disengage the mechanical securing mechanism and/or disengage the brakes only after the door has been closed. The cabin management system may be configured such that the brakes are disengaged after the securing mechanism has been disengaged.

The floor detector may be further configured to activate a slowdown system, configured to reduce the speed of the cabin during travel.

The drive system may comprise a pressurized-fluid motor. The drive system may further comprise an electric motor, and be configured to be selectively operated to utilize one of the pressurized-fluid and electric motors to facilitate travel of the cabin. Respective output shafts of the pressurized-fluid and electric motors may be mechanically coupled to rotate in tandem with one another.

According to another aspect of the presently disclosed subject matter, there is provided an elevator system comprising a cabin-management system as described above.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 8A through 8D schematically illustrate a hydraulic timer of the cabin-management system illustrated in FIG. 7.

DETAILED DESCRIPTION

Figure 1A:
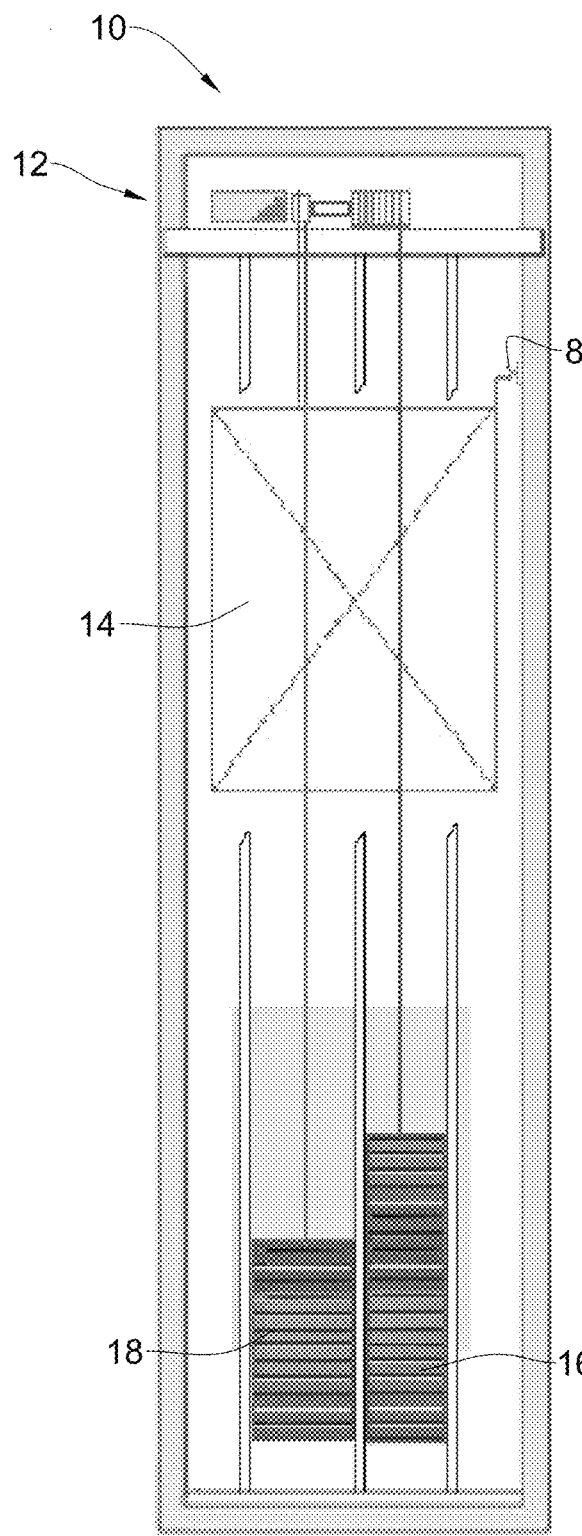
FIGS. 1A and 1B is a schematic illustration of an elevator system according to the presently disclosed subject matter, with a cabin thereof in two different vertical positions.
Figure 1B:
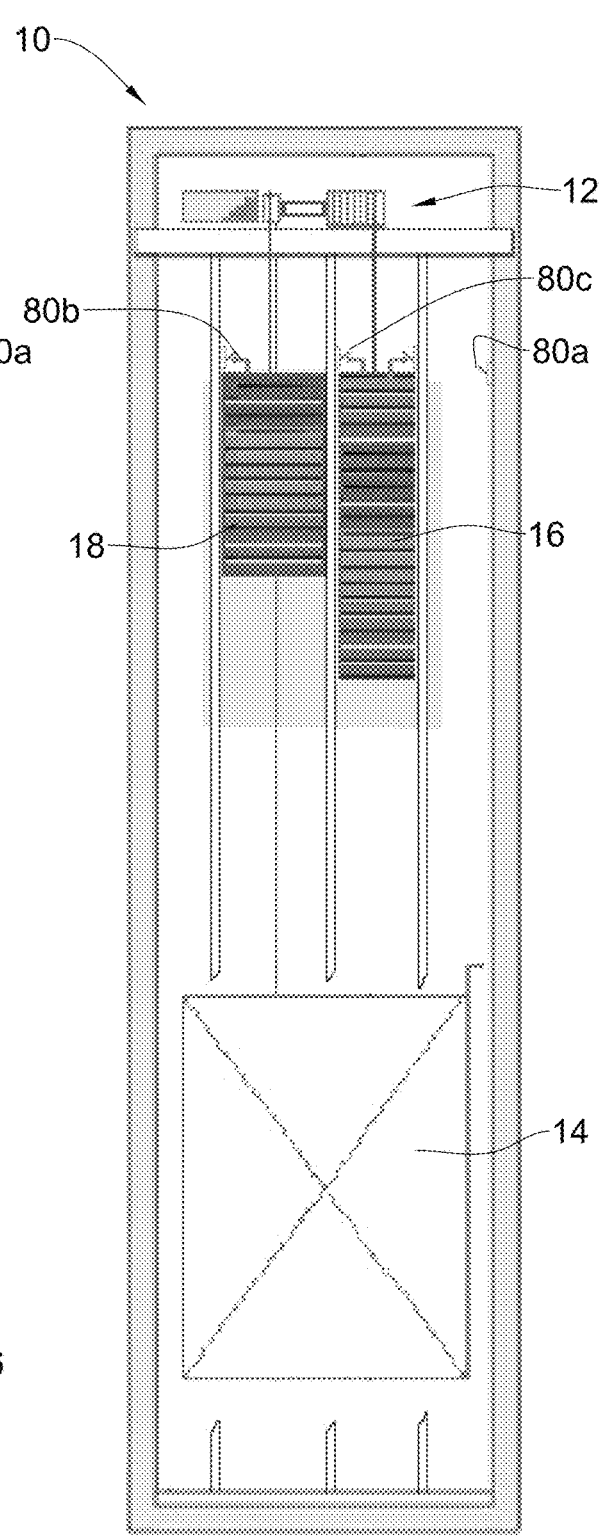

As illustrated in FIGS. 1A and 1B, there is provided an elevator system, which is generally indicated at 10. The system 10 comprises a drive system 12, one or more elevator cabins 14 (in the present disclosure and appended claims, elevator cabins may be interchangeably referred to in the singular or the plural, without limiting the scope thereof to that indicated by the strict meaning of the form), a drive weight 16 associated with each of the cabins, and a counterweight 18 associated with each of the cabins.

The drive system 12 is configured to raise and lower the elevator cabin 14, selectively operating the elevator system 10 in either an electric mode or a hydraulic mode. As will be clear from the present disclosure, the electric mode may be useful for traditional operation (e.g., wherein a user calls one of the cabins 14 to his floor, and selects a destination floor once aboard the cabin), and a hydraulic mode, which may be useful for automatic operation (e.g., in which each of the cabins 14 follows a predetermined route, for example stopping at each floor in succession, without the need for or ability of a user to intervene). It will be appreciated that while the drive system 12 as disclosed herein is suited for use in a machine room-less arrangement, an elevator system may be provided with a drive system suitable for use with a machine room without departing from the scope of the presently disclosed subject matter, mutatis mutandis. It will be appreciated that the elevator system 10 may comprise one or more safety mechanisms configured to implement, during operation under hydraulic mode, one or more elements which are ordinarily used only in electric mode, for example if an emergency situation is detected (e.g., if the rate of descent of the cabin 14 exceeds a predetermined speed an electric brake may be activated, if a cabin door is open at a floor at which the cabin 14 is not located the drive system may be halted, etc.).

Figure 2:
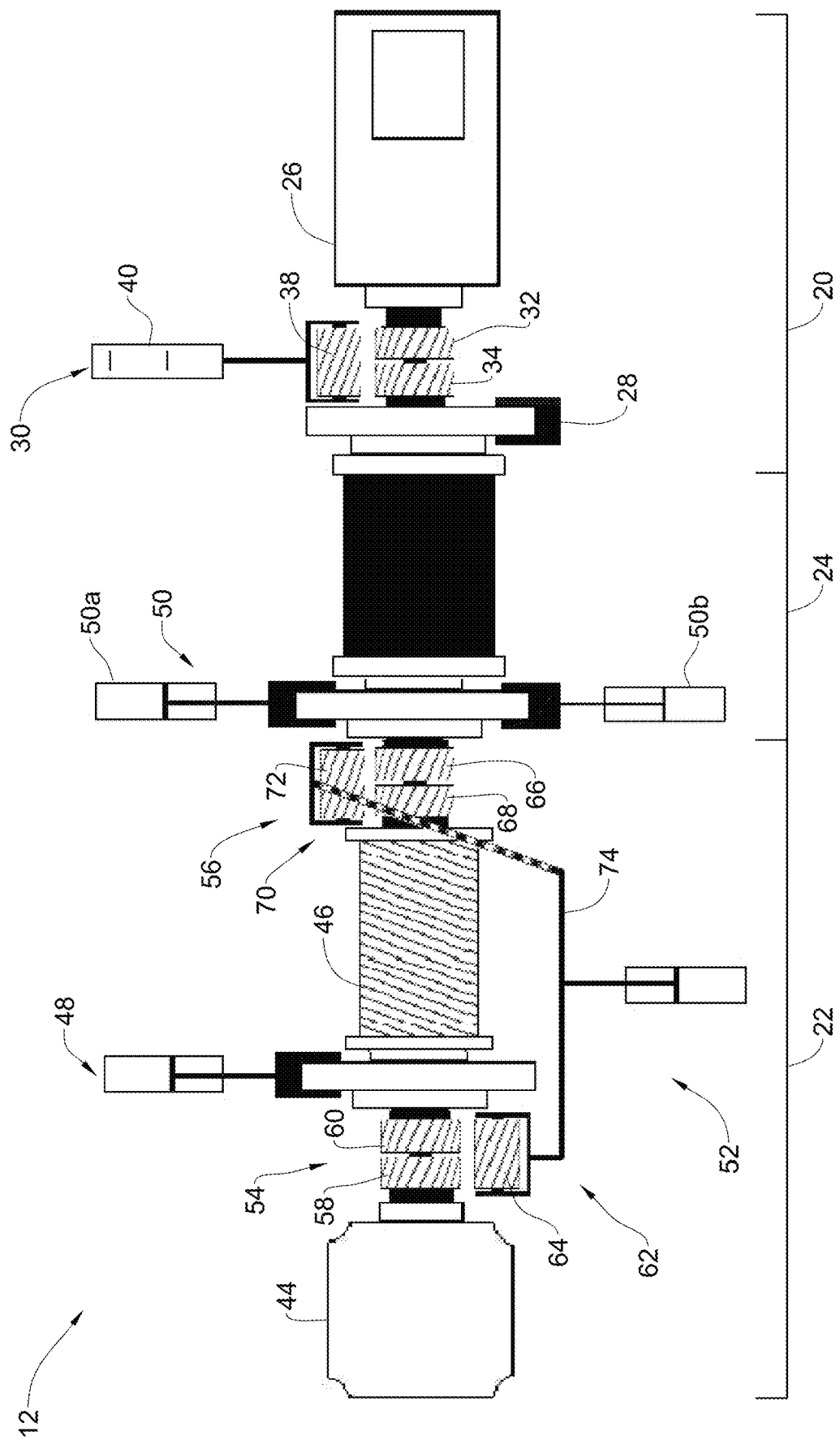
FIG. 2 is a schematic illustration of an example of a drive system of the elevator system illustrated in FIGS. 1A and 1B.

As illustrated in FIG. 2, the drive system 12 may comprise an electric system 20 and a hydraulic system 22, configured for operating the elevator system 10 in, respectively, the electric mode and the hydraulic mode. It further comprises a cabin pulley assembly 24 to which the cabin 14 and counterweight 18 are mounted, and configured for facilitating raising and lowering the cabin during each of the modes.

The electric system 20 comprises an electric motor 26 configured for providing the necessary torque to raise and controlledly lower the cabin 14 during the electric mode. An electric brake 28, e.g., mounted on the output shaft of the electric motor 26, may be provided, for example to stop the cabin 14 at the various floors served thereby, and it may also provide one or more safety functions, for example securing the cabin when its doors are open, preventing the cabin from moving when doors are open on a floor at which the cabin is not, stopping the 14 from dropping in the event of a failure of the electric motor 26, etc. The electric system 20 may operate as is well known in the art, and may comprise other elements not described herein and/or illustrated in the accompanying figures.

In addition, the electric system 20 comprises an electric engagement arrangement, which is generally indicated at 30, configured to selectively connect and disconnect the electric motor 26 to the cabin pulley assembly 24, thereby facilitating selecting the mode of operation of the elevator system 10.

The electric engagement arrangement 30 comprises a drive gear 32, a driven gear 34, and a mating arrangement 36. The drive gear 32 is driven directly by the electric motor 26, for example being mounted on its output shaft, and the driven gear 34 operates the cabin pulley assembly 24, for example being mounted thereto such that they rotate in tandem with one another. The mating arrangement 36 is configured to selectively operationally connect the drive gear 32 and driven gear 34, such that the electric motor 26 is operatively connected to the cabin pulley assembly 24 to drive its operation. Accordingly, it may comprise a mating gear 38, which is configured to simultaneously mesh with both the drive and driven gears 32, 34 such that they rotate in tandem with one another, and an actuator 40, e.g., electrically controller, configured to selectively bring the mating gear 38 in and out of mesh with the drive and driven gears 32, 34. One having skill in the art will recognize that the electric engagement arrangement 30 may comprise any other suitable arrangement to selectively operationally connect the electric motor 26 and the cabin pulley assembly 24.

It will be appreciated that the gears 32, 34, 38 of the electric engagement arrangement 30 may be spur gears, helical gears, or any other suitable gears. It will be further appreciated that a description in the presently disclosed subject matter of a single gear is representational in nature, i.e., an assembly of several gears or one or more other suitable power transmission elements may be provided in place of one or more of the gears described herein.

When the elevator system 10 is operating in its electric mode, the electric engagement arrangement 30 is always operating to connect between the electric motor 26 and the cabin pulley assembly 24, e.g., the mating gear 38 is in mesh with both the drive gear 32 and the driven gear 34, and in the hydraulic mode, it always operates to maintain a disconnection between the electric motor and the main pulley assembly, e.g., the mating gear is out of mesh with one or both of the drive and driven gears.

The hydraulic system 22 comprises a hydraulic motor 44 configured to provide the necessary torque to raise the drive weight 16, and a drive pulley 46 to which the drive weight is mounted for being raised thereby, and which is driven by the drive weight upon its descent. A hydraulic power unit (e.g., as described below with reference to and illustrated in FIG. 9), is provided, for example at a remote location, in order to provide power to the hydraulic motor 44, for example as is well known in the art.

The hydraulic system 22 may optionally comprise a drive brake 48, e.g., mounted in tandem with the drive pulley 46, provided as a safety feature, for example to prevent the drive weight 16 from descending too rapidly. In addition, a cabin brake 50, e.g., mounted in tandem with the cabin pulley assembly 24 and being associated with a speed-reducing caliper 50a and a stopping caliper 50b, may be provided to facilitate control of the cabin's movement, as will be described below.

The hydraulic system 22 further comprises a clutch assembly 52, configured to selectively operationally connect between the hydraulic motor 44 and the drive pulley 46, and between the drive pulley 46 and the cabin pulley assembly 24. Accordingly, it comprises a motor-side engagement arrangement 54, configured to facilitate selectively connecting between the hydraulic motor 44 and the drive pulley 46, and a cabin-side engagement arrangement 56, configured to facilitate selectively connecting between the drive pulley 46 and the cabin pulley assembly 24.

Each of the engagement arrangements 54, 56 may operate similarly to the electric engagement arrangement 30 described above with reference to the electric system 20, mutatis mutandis.

Accordingly, the motor-side engagement arrangement 54 comprises a drive gear 58, a driven gear 60, and a mating arrangement 62. The drive gear 58 is driven directly by the hydraulic motor 44, for example being mounted on its output shaft, and the driven gear 60 operates the drive pulley 46, e.g., being mounted thereto such that they rotate in tandem with one another. The mating arrangement 62 is configured to selectively operationally connect the drive gear 58 and driven gear 60, such that the hydraulic motor 44 is operatively connected to the drive pulley 46 to drive its operation. Accordingly, it may comprise a mating gear 64, which is configured to simultaneously mesh with both the drive and driven gears 58, 60 such that they rotate in tandem with one another, and to be brought in and out of mesh therewith, as will be described below.

The cabin-side engagement arrangement 56 comprises a drive gear 66, a driven gear 68, and a mating arrangement 70. The drive gear 66 is driven directly by the drive pulley 46, for example being mounted thereto such that they rotate in tandem with one another, and the driven gear 68 operates the cabin pulley assembly 24, for example being mounted thereto such that they rotate in tandem with one another. The mating arrangement 70 is configured to selectively operationally connect the drive gear 66 and driven gear 68, such that the drive pulley 46 is operatively connected to the cabin pulley assembly 24 to drive its operation. Accordingly, it may comprise a mating gear 72, which is configured to simultaneously mesh with both the drive and driven gears 66, 68 such that they rotate in tandem with one another, and to be brought in and out of mesh therewith, as will be described below.

It will be appreciated that the gears 58, 60, 64, 66, 68, 72 of the motor- and cabin-side engagement arrangements 54, 56 may be spur gears, helical gears, or any other suitable gears or combinations thereof.

The clutch assembly 52 further configured to ensure that the drive pulley 46 is operationally connected to only one of the hydraulic motor 44 and the cabin pulley assembly 24 at any given time. Accordingly, it may comprise a transmission rod 74 configured to selectively and simultaneously operate the mating arrangements 62, 70 such that when the drive gears 58, 66 and driven gears 60, 68 of one of the engagement arrangements 54, 56 are in mesh, the respective gears of the other engagement arrangement are out of mesh, and vice versa. When the elevator system is operating in its electric mode, the clutch assembly 52 is positioned such that the cabin-side engagement arrangement 56 is disengaged from the drive pulley 46, so that the drive weight 16 does not interfere with the operation of the electric system 20.

In operation, the cabin 14 is raised by the force of the drive weight 16 descending. Accordingly, when the cabin 14 is ascending, the clutch assembly 52 is positioned such that the cabin-side engagement arrangement 56 connects between the drive pulley 46 and the cabin pulley assembly 24, so that the drive weight 16 raises the cabin 14 (i.e., the descent of the drive weight rotates the drive pulley, which in turn rotates the cabin pulley assembly, raising the cabin). When the cabin 14 reaches its uppermost position and is ready to descend, the clutch assembly 52 operates to disengage the cabin-side engagement arrangement 52 (thereby disconnecting the cabin pulley assembly 24 from the drive pulley 46), and to engage the motor-side engagement arrangement 54 (thereby connecting the drive pulley to the hydraulic motor 44). Accordingly, while the cabin 14 is descending under the influence of its own weight, the hydraulic motor 44 raises the drive weight 16. When the cabin reaches its lowermost position and is ready to ascend, the clutch assembly 52 operates to disengage the motor-side engagement arrangement 54 (thereby disconnecting the drive pulley 46 from the hydraulic motor 44), and to engage the cabin-side engagement arrangement 52 (thereby connecting the cabin pulley assembly 24 to the drive pulley 46). Operation then proceeds as described above.

The cabin pulley assembly 24 (or any other part of the elevator system) may comprise a speed limiter (not illustrated), such as a hydraulic governor, configured to regulate the speed of descent of the cabin 14 under its own weight. The speed limited may be configured to ensure a substantially uniform rate speed of descent, irrespective of the weight of the passengers within the cabin 14.

The operation of the various mechanisms of the hydraulic system 22 may be hydraulic as well. Accordingly, the elevator system 10 may comprise pneumatic sensors at various predetermined positions in order to facilitate the timing of their operation. The pneumatic sensors may comprise pneumatic switches, each configured to send a pneumatic signal when acted upon, e.g., as known in the art, to activate part of the hydraulic system 22.

Reverting to in FIGS. 1A and 1B, the elevator system 10 may comprise first, second, and third height sensors 80*a*, 80*b*, 80*c*, disposed so as to be activated by, respectively, the cabin 14, the drive weight 16, and the counterweight 18, each in its uppermost position.

When the cabin 14 is in its uppermost position (e.g., as illustrated in FIG. 1A), the cabin 14 activates the first height sensor 80*a* (in the present disclosure, a description of an element activating a sensor implicitly includes same being performed by a member attached thereto). As mentioned above, in this position, the cabin 14 is ready to descend. Accordingly, activation of the first height sensor 80*a* sends a pneumatic signal to the clutch assembly 52 to disengage the cabin-side engagement arrangement 52, and to engage the motor-side engagement arrangement 54, thereby allowing the cabin 14 to descend under the influence of its own weight. In addition, a pneumatic signal is sent to connect the hydraulic motor 44 to the hydraulic power unit, thereby allowing the drive weight 16 to be raised by the hydraulic motor 44.

When the cabin 14 is in its lowermost position (e.g., as illustrated in FIG. 1B), the counterweight 18 is in its uppermost position, and activates the second height sensor 80*b*. When the drive weight 16 is in its uppermost position, it activates the third height sensor 80*c*. When both sensors are activated, it indicates that the cabin 14 is ready to ascend, and the drive weight 16 is in a position to raise it. Accordingly, activation of the second and third height sensors 80*b*, 80*c* sends a pneumatic signal to the clutch assembly 52 (or each sends a signal, with the clutch assembly being configured to respond only when both signals have been received) to disengage the motor-side engagement arrangement 54, and to engage the cabin-side engagement arrangement 52, thereby allowing the cabin 14 to be raised by the weight of the drive weight 16. Activation of the third height sensor 80*c* by the drive weight 16 may further send a pneumatic signal to disconnect the hydraulic motor 44 from the hydraulic power unit.

As the hydraulic motor 44 is disconnected from the hydraulic power unit when the cabin 14 is ascending, it may be turned off during that time. Alternatively, the elevator system 10 may be designed such that the hydraulic power unit is always operating at a constant pressure. When the cabin 14 is ascending, the excess hydraulic pressure from the power unit may be stored in any suitable manner, for example as known in the art, e.g., using a hydraulic accumulator, a heat exchanger, etc.

According to some examples, the elevator system 10 comprises two (or more) drive systems 12 as described above, each associated with its own cabin 14, drive weight 16, and counterweight 18. Each of the drive systems 12 may comprise its own hydraulic motor 44, or the two may share a single hydraulic motor. The two drive systems 12 may be configured such that when the cabin 14 of the first is ascending (i.e., its drive pulley 46 is disconnected from the hydraulic motor 44), the cabin of the second is descending (i.e., its drive pulley is operationally connected to the hydraulic motor 44). In this way, the amount of time during which the power unit drives the hydraulic motor is increased. According to other examples, the power unit may be set to provide the minimal amount of energy (optionally within a factor of safety) to operate the hydraulic motor 44 to raise the drive weight 16 at such as speed that it matches the minimum amount of time necessary for the cabin to descend.

Figure 3:
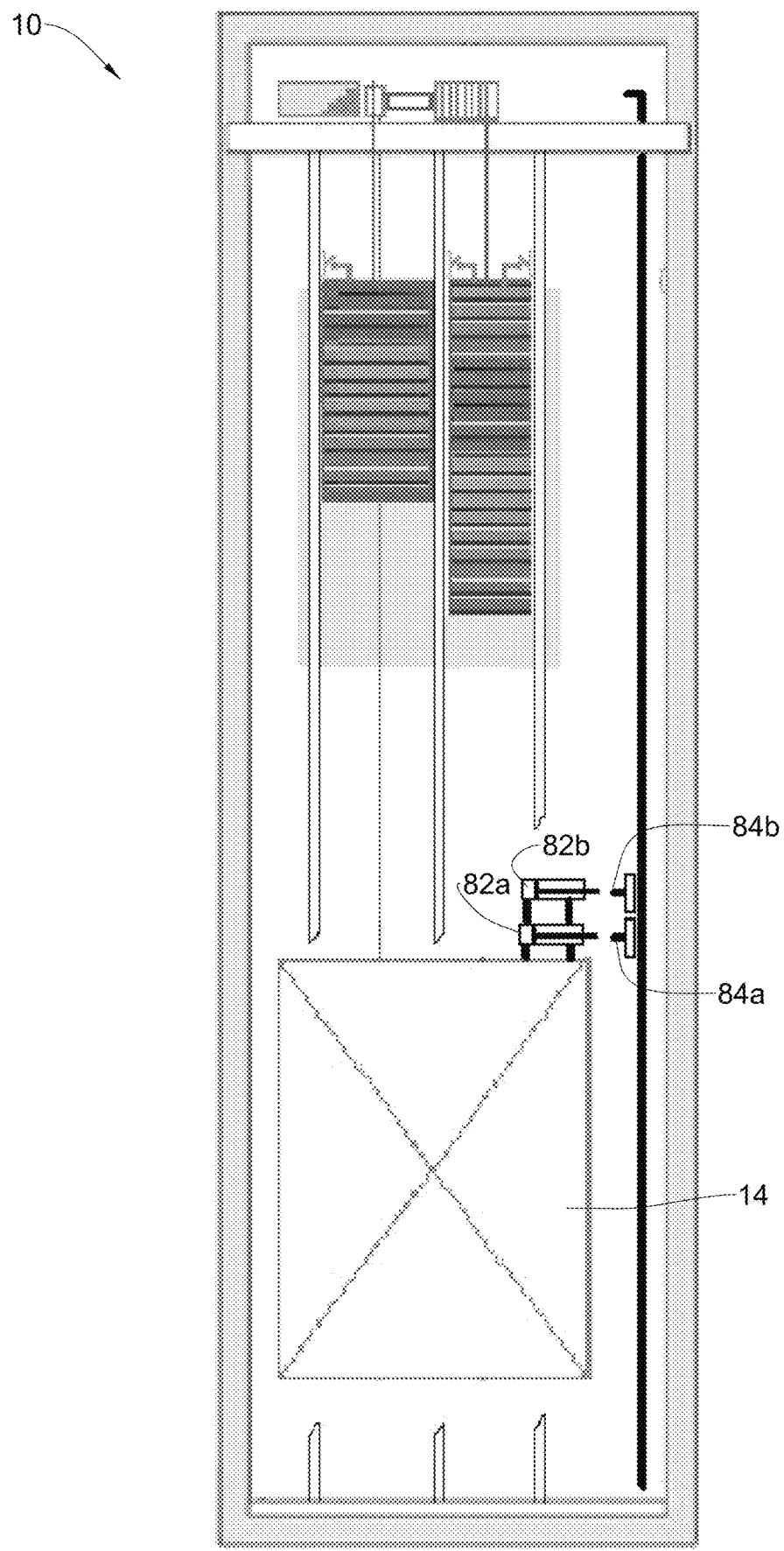
FIG. 3 further illustrates the elevator system illustrated in FIGS. 1A and 1B.

According to some examples, for example as illustrated in FIG. 3, the elevator system may comprise floor sensors 82a, 82b mounted on the cabin 14. Activators 84a, 84b, are located at each story of the building in suitable locations, configured to activate each of the floor sensors 82a, 82b to send a pneumatic signal to the cabin brake 50 when acted upon. A first floor sensor 82a may be configured to send a pneumatic signal to activate the speed-reducing caliper 50a of the cabin brake 50, thereby beginning the reduction of speed of the cabin 14 as it approaches a floor, and the second floor sensor 82b may be configured to activate the stopping caliper 50b of the cabin brake 50, thereby completely stopping the motion of the cabin 14 when it is at a suitable position at a story the building.

Figure 4:
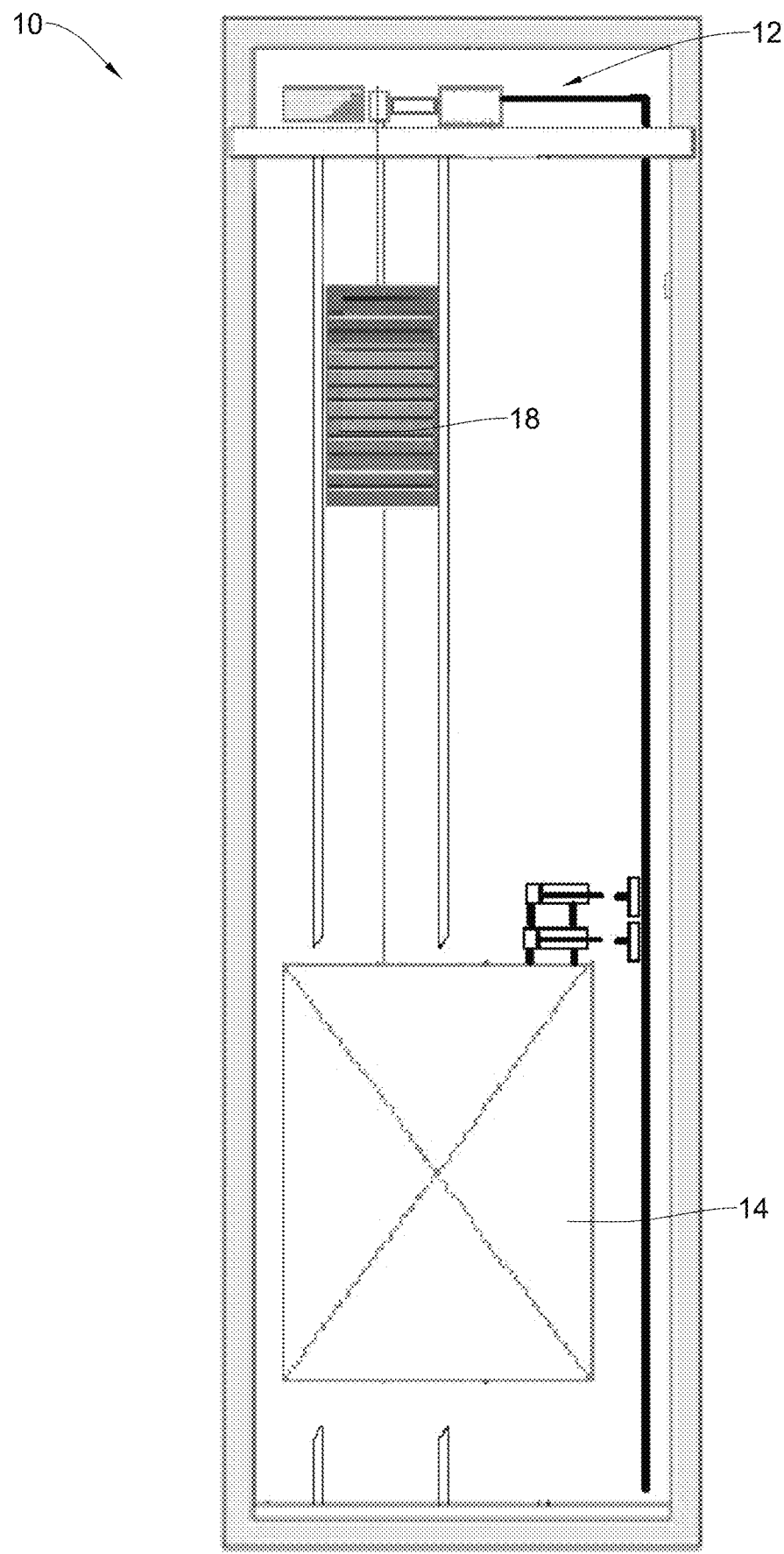
FIG. 4 is a schematic illustration of another example of an elevator system according to the presently disclosed subject matter.
Figure 5:
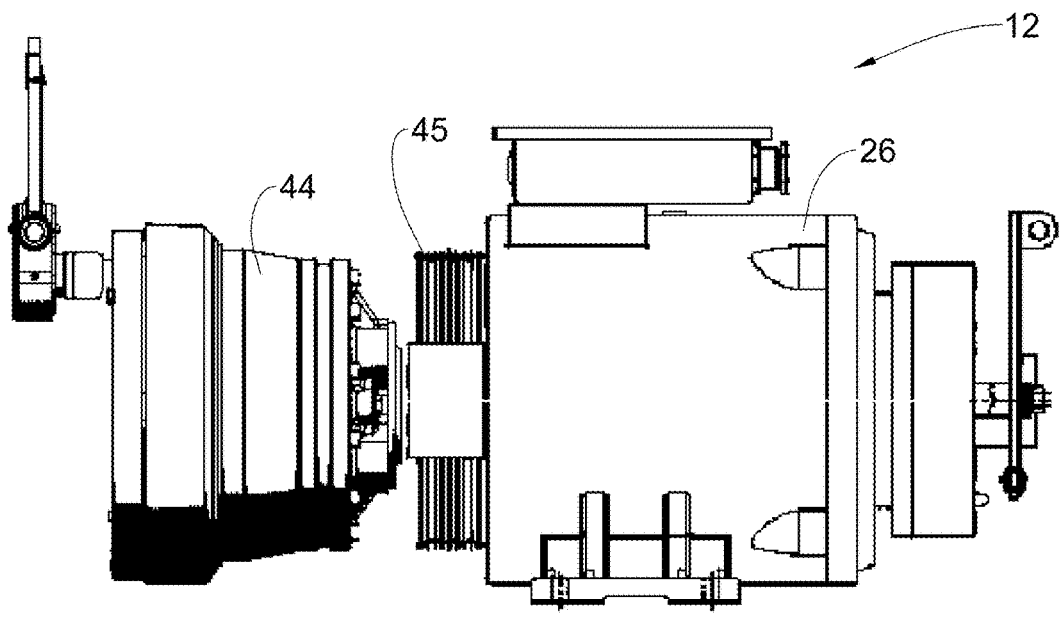
FIG. 5 is a schematic illustration of an example of a drive system of the elevator system illustrated in FIG. 5.

As illustrated in FIGS. 4 and 5, the elevator system 10 may be provided according to a simplified design. According to this example, only a counterweight 18 is provided. In addition, as best seen in FIG. 5, the drive system 12 comprises an electric motor 26 and a hydraulic motor 44, coupled by a single axle (not illustrated). A pulley 45 is mounted on the axle. The electric and hydraulic motors 26, 44 may be any suitable motors. In particular, each may be configured to free-wheel, i.e., for its output shaft to be rotated by an external force. Examples of suitable hydraulic motors are the Black Bruin® hydraulic motors manufactured by Sampo Hydraulics, Ltd.

According to this example, when the elevator system 10 operates in electric mode, the hydraulic motor 44 is set to free-wheel, e.g., a clutch thereof is disengaged, and only the electric motor 26 operates to rotate the pulley 45, and thus raise and lower the cabin 14. When the elevator system 10 operates in hydraulic mode, no electric power is supplied to the electric motor 26, and only the hydraulic motor 44 operates to rotate the pulley 45 to raise and lower the cabin 14.

The elevator system 10 described with reference to and illustrated in FIGS. 4 and 5 may comprise one or more of the features (e.g., sensors, etc.) described herein with reference to and illustrated in FIGS. 1A, 1B, and 3, mutatis mutandis.

It will be appreciated that a drive system, for example as described above with reference to and illustrated in either of FIGS. 2 and 5, may be provided for use with other kinds of motor-driven transportation systems, including, but not limited escalators, moving sidewalks, etc., without departing from the scope of the presently disclosed subject matter, mutatis mutandis.

Figure 6:
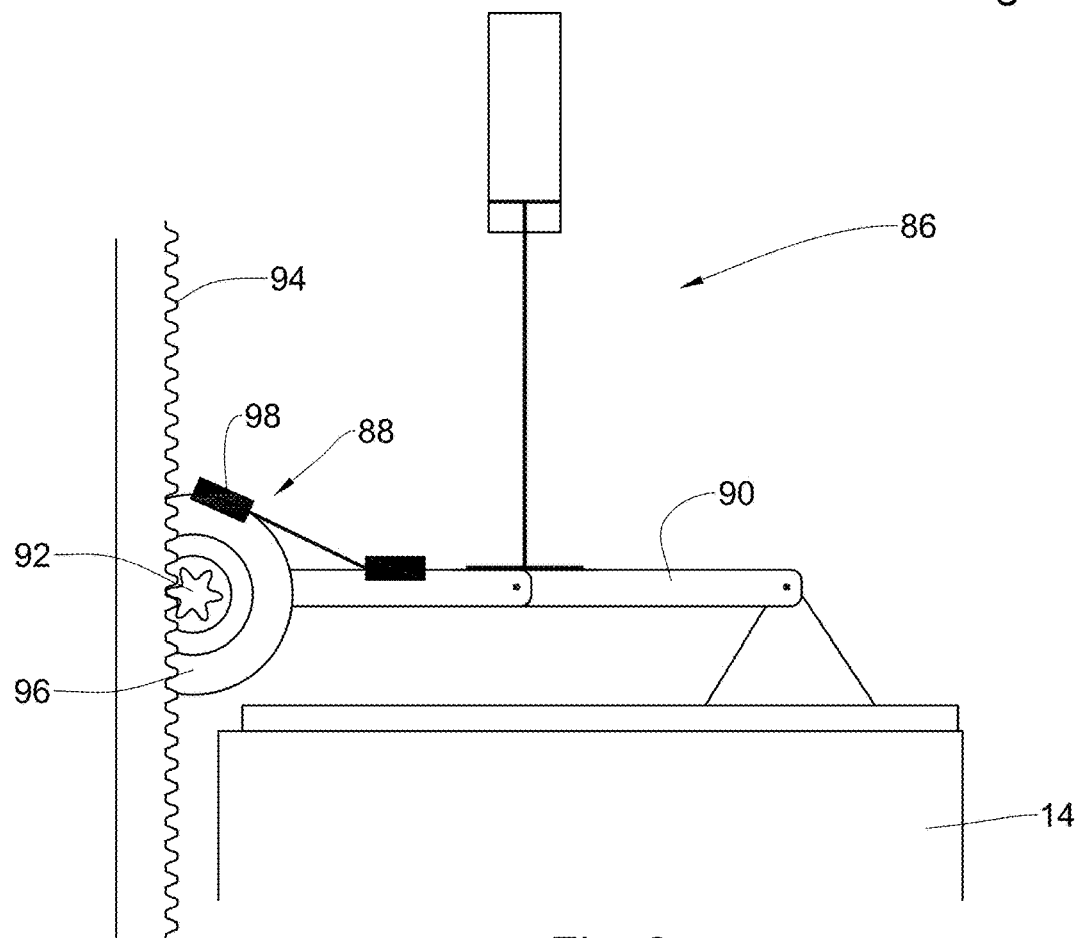
FIG. 6 illustrates an example of a brake of the elevator system illustrated in FIG. 1.

As illustrated in FIG. 6, the elevator system 10 may comprise an alternative braking mechanism, for example for use in systems designed for buildings whose heights make the use of floor sensors 82a, 82b (not illustrated in FIG. 6), as described with reference to and illustrated in FIG. 3, impractical. The brake 86 comprises a pinion wheel 88 mounted on the end of an engagement member 90, which is mounted on the cabin 14. The pinion wheel 88 comprises a gear 92 which is in mesh with a vertical rack 94 extending along the height of the elevator shaft. The pinion wheel 88 further comprises a brake disk 96, which may be engaged by a brake pad 98 mounted on the engagement member 90. The brake pad may be controlled by the floor sensors 82a, 82b as described above. When the elevator system 10 is operating in electric mode, the engagement member may be raised, thereby disengaging the pinion wheel 88 from the vertical rack 94, rendering the brake 86 inoperable to affect the motion of the cabin 14. It will be appreciated that any other suitable alternate braking mechanism may be provided, for example one in which one or more brake pads are provided to be applied directly to part of the elevator shaft, a rigidly-mounted member extending within the elevator shaft (for example provided for that purpose, for guiding the cabin 14, etc.), without departing from the scope of the presently disclosed subject matter, mutatis mutandis.

Figure 7:
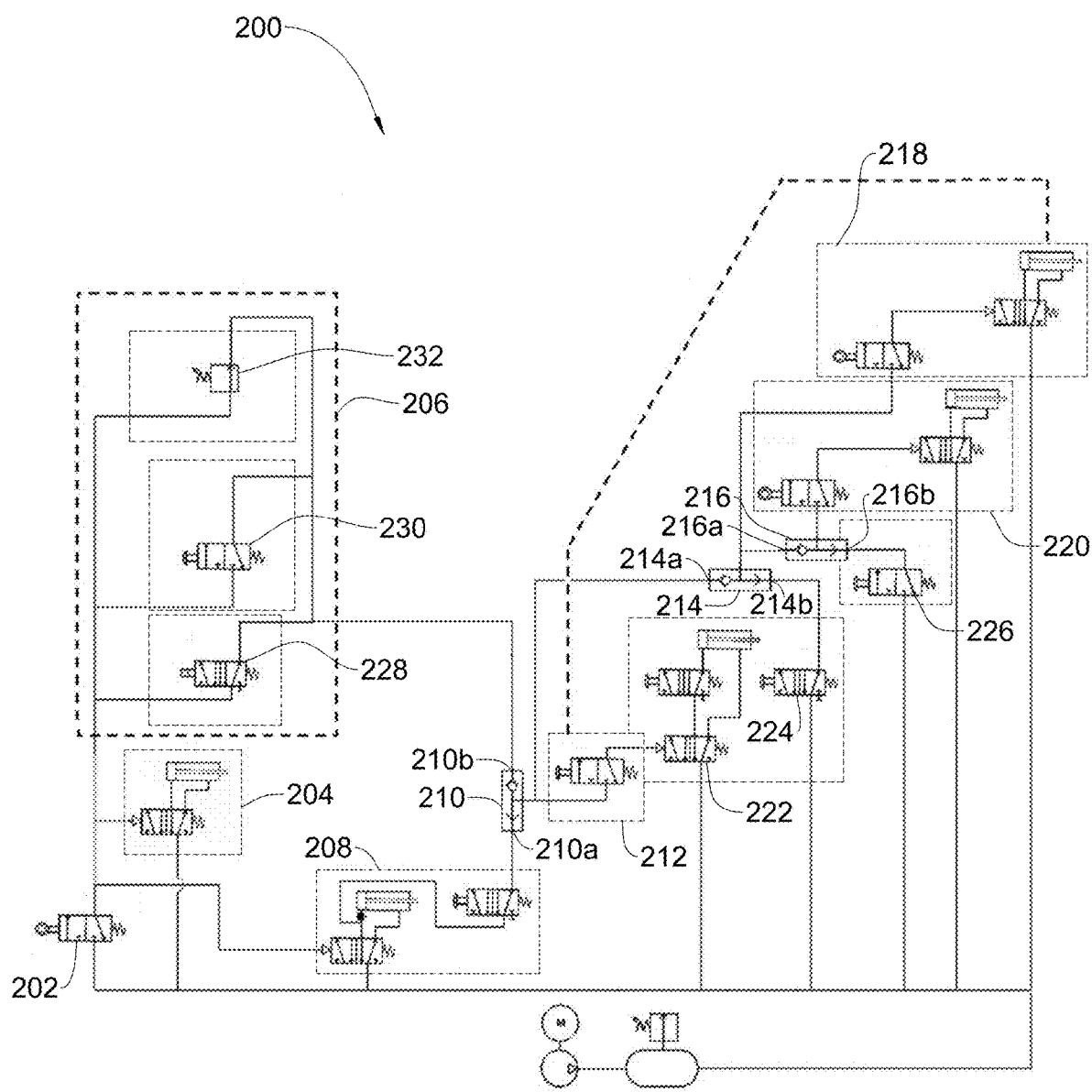
FIG. 7 illustrates an example of a cabin-management system of the elevator system illustrated the above-listed figures.

As illustrated in FIG. 7, the elevator system 10 may further comprise a cabin-management system, which is generally indicated at 200, configured to direct operation of the cabin 14, and other elements of the elevator system 10 which are activated when the cabin is located at a floor, when it approaches a floor and leaves a floor, including of its door, e.g., including opening, closing, locking, etc. The cabin-management system 200 may be disposed directly on the cabin 14, or at any other suitable location of the elevator system 10. According to some examples, a separate cabin-management system 200 is provided at each floor of the building, to direct operation of the cabin 14 and other elements of the elevator system 10 when the cabin is at its respective floor, mutatis mutandis.

The elevator system 10 may be configured such that the cabin-management system 200 is operating in its hydraulic mode, and comprises a separate system for performing the same functions when operating in its electric mode. The elevator system 10 may comprise a mechanism to ensure that these systems do not operate simultaneously.

The cabin-management system 200 comprises a floor detector 202, configured to identify when the cabin 14 approaches and/or reaches a floor. When it is so activated, it sends a signal to (a) a slowdown system 204, (b) an optional safety system 206, and (c) a hydraulic timer 208 (which may be as described below, or any other suitable hydraulic timer known in the art). When the timer is activated, it sends a signal to a first input 210a of a first OR-gate 210 (which may be, e.g., a shuttle valve). If any of the safety checks fails (i.e., if the respective unsafe condition is detected), the safety system 206 sends a signal to a second input 210b of the first OR-gate 210. If either of these signals are present, the first OR-gate 210 passes the signal.

The output of the first OR-gate 210 is directed toward a lock-detector 212 (configured to identify if a mechanical securing mechanism has been deployed) and a first input 214*a* of a second OR-gate 214 (discussed further below). The output of the second OR-gate 214 is directed to a first input 216*a* of a third OR-gate 216 (discussed further below) and a locking system 218, which is configured to secure the cabin 14 at its vertical position, for example by deploying a bolt or other securing mechanism. The output of the third OR-gate 216 is configured to activate a braking system 220, e.g., as described above. Accordingly, when the cabin 14 approaches a floor, its operation is slowed, brakes are applied, and it is mechanically secured into position.

As mentioned above, the lock-detector 212 is configured to verify that the mechanical securing mechanism has been deployed. When a positive signal is received, it sends a signal to a cabin-opening mechanism 222, e.g., as described above, to open the door to the cabin 14. When the timer 208 expires, the signal ceases to be sent to the cabin-opening mechanism 222, as will be described below, thereby closing the door. A door sensor 224 is provided to identify if the door is in an open position (e.g., due to a passenger holding the door open, the door is otherwise obstructed, etc.). The output of the door sensor 224 is directed to the second input 214*b* of the second OR-gate 214. Accordingly, if the door of the cabin 14 is held open, even after expiry of the timer, the brakes remain applied and the mechanical securing mechanism remains deployed. A lock-release sensor 226, configured to pass a signal to the second input 216*b* of the third OR-gate 216, detects whether the mechanical securing mechanism has been released, ensuring that the brakes are not disengaged until the mechanical securing mechanism has been disengaged.

Once the door closes and the timer 208 expires, the brakes and mechanical securing mechanism are disengaged, and the cabin 14 may proceed to the next floor. However, as the cabin is still (initially) located at the floor, the floor detector 202 still remains active, and thus the slowdown system 204 is engaged. Accordingly, the initial motion of the cabin 14 is slow, preventing sudden movement thereof.

It will be appreciated that the cabin-management system 200 described above, and other similar such systems which operate hydraulically, the floor detector 202 is activated as long as the cabin 14 is located at a floor. As the floor detector 202 activates the hydraulic timer 208, and such activation initiates a process as described above which maintains the brakes and lock in their engaged positions with the door open, the cabin-management system 200 according to the presently disclosed subject matter is designed such that the hydraulic timer 208 is not continuously reset once the cabin 14 reaches a floor.

Accordingly, as illustrated in FIGS. 8A through 8D, the hydraulic timer 208 may comprise a first hydraulic control valve 240, a hydraulic cylinder 242, a second hydraulic control valve 244, and a flow control valve 245.

The hydraulic cylinder 242 comprises a housing 246 defining therewithin a cavity, a piston 250 slideably received within the cavity and dividing it between rear and front chambers 254*a*, 254*b*, and a rod 256 mounted on a forward-facing side of the piston and projecting through a sealed opening on a front end of the housing. Each of the chambers 254*a*, 254*b* is configured to be connected to a hydraulic inlet. When the hydraulic pressure in the rear chamber 254*a* is greater than that in the front chamber 254*b*, the piston 250 moves forwardly, thereby extending the rod 256. When the hydraulic pressure of the front chamber 254*b* is greater than that in the rear chamber 254*a*, the piston 250 moves rearwardly, thereby retracting the rod 256.

The first hydraulic control valve 240 comprises an inlet 241 and first and second outlets 240*a*, 240*b*. The first outlet 240*a* is in fluid communication with the rear chamber 254*a* of the hydraulic cylinder 242 via the flow control valve 245, and with an inlet 244*a* of the second hydraulic control valve 244, and the second outlet 240*b* is in fluid communication with the front chamber 254*b* of the hydraulic cylinder.

The flow control valve 245 is configured to regulate the speed of the hydraulic fluid flowing therethrough. It may comprise any suitable element, e.g., an orifice, a flow regulator, etc., as is well-known in the art for controlling the flowrate of fluid in a hydraulic system.

As seen in FIGS. 8A and 8D, when the floor detector 202 is not engaging the first hydraulic control valve 240, it is in an inactive position, in which the inlet 241 (and thus the supply of hydraulic fluid) is connected to the second outlet 241*b*, and thus to the front chamber 254*b* of the hydraulic cylinder 242. As seen in FIGS. 8B and 8C, when the floor detector 202 activates the first hydraulic control valve 240, is assumes an active position, in which the inlet 241 is connect to the first outlet 240*a*.

As seen in FIGS. 8A and 8B, when the second hydraulic control valve 244 is unactivated, it is in an open position, in which its inlet 244*a* is in fluid communication with an outlet 244*b* thereof, which is connected to the first OR-gate 210 of the cabin-management system 200. When the second hydraulic control valve 244 is activated, as seen in FIGS. 8C and 8D, it assumes a closed position, in which its inlet 244*a* is fluidly isolated from its outlet 244*b*.

Accordingly, when the first hydraulic control valve 240 is activated, hydraulic fluid flows into the rear chamber 254*a* of the hydraulic cylinder 242, thereby increasing the pressure therein, causing the rod 256 to extend. The flow control valve 245 is designed such that it takes a predetermined amount of time to pass sufficient hydraulic fluid to extend the rod 256; this predetermined amount of time determines the time interval measured by the hydraulic timer 208, as will be explained below (accordingly, the parameters of the flow control valve may be selected based on the desired time to be measured by the timer).

Thus, operation of the hydraulic timer 208 may proceed as follows:

As illustrated in FIG. 8A, in a first position of the hydraulic timer 208, e.g., when the floor detector 202 does not identify a cabin 14 at its respective floor, the first hydraulic control valve 240 is in it inactive position, in which hydraulic fluid is passed from its inlet 241 via its second outlet 240*b* to the front chamber 254*b* of the hydraulic cylinder 242. Accordingly, when a cabin 14 is not detected at a given floor, the rod 256 of the hydraulic cylinder 242 is in its retracted position. The second hydraulic control valve 244 is in its open position, but no hydraulic fluid is supplied thereto, owing to the position of the first hydraulic control valve 240, as described above.

As illustrated in FIG. 8B, in a second position of the hydraulic timer 208, e.g., when the floor detector 202 first identifies a cabin 14 at its respective floor, the first hydraulic control valve 240 is engaged by the floor detector 202, causing it to assume its active position. As described above, in this position the first hydraulic control valve 240 passes hydraulic fluid through its first outlet 240*a* to the rear chamber 254*a* of the hydraulic cylinder 242 via the flow control valve 245, causing the rod 256 to begin to gradually extend (as indicated by the arrow). At the same time, hydraulic fluid is passed to the inlet 244*a* of the second hydraulic control valve 244, which is in its open position, thus passing it to the first OR-gate 244, and constituting a hydraulic signal, as described above. This triggers the various components of the cabin-management system 200, for example as described above with reference to and illustrated in FIG. 7.

As illustrated in FIG. 8C, in a third position of the hydraulic timer 208, e.g., after the predetermined amount of time has elapsed, the rod 256 of the hydraulic cylinder 242 is fully extended, thereby activating the second hydraulic control valve 244, causing it to assume a closed position. As the first hydraulic control valve 240 is still in its active position (e.g., owing to the cabin 14 remaining at the floor, for example until the door thereto has closed, and the brakes and mechanical securing mechanisms have been disengaged), hydraulic fluid is still being supplied to the inlet 244a of the second hydraulic control valve 244; however, as it is in its closed position, it is not passed to the first OR-gate 244, or any other component of the cabin-management system 200. Accordingly, once the rod 256 of the hydraulic cylinder 242 has been fully extended, the cabin-management system 200 may proceed to prepare the cabin 14 for movement, e.g., closing the door, disengaging the brakes and mechanical securing mechanisms, etc.

As illustrated in FIG. 8D, in a fourth position of the hydraulic timer 208, e.g., immediately following movement of the cabin 14 away from the respective floor, the floor detector 202 no longer identifies a cabin at the respective floor, and thus ceases to engage the first hydraulic control valve 240, returning it to its inactive position. As described above, in this position hydraulic fluid is passed from the inlet 241 via its second outlet 240b to the front chamber 254b of the hydraulic cylinder 242, causing the rod 256 to retract (as indicated by the arrow), which causes the second hydraulic control valve 244 to return to its open position. In addition, hydraulic fluid is no longer passed to the inlet 244a of the second hydraulic control valve 244. Accordingly, once the rod 256 has fully retracted, the hydraulic timer 208 returns to its first position, as described above with reference to and illustrated in FIG. 8A.

It will be appreciated that the third position of the hydraulic timer 208 described above with reference to and illustrated in FIG. 8C, in which the first hydraulic control valve 240 is in its active position and the second hydraulic control valve 244 is in its closed position, prevents the hydraulic timer from continuously resetting when the cabin 14 is at a respective floor.

The safety system 206 may comprises one or more safety mechanisms. For example, a power sensor 228 detects and sends a signal in the event of a power outage, a weight sensor 230 detects if the cabin 14 is loaded above its capacity, and a pressure sensor 232 detects if the hydraulic pressure in the elevator system 10 is below a predetermined level. If any of these are true, a signal is sent to the second input 210b of the first OR-gate 210, ensuring that the cabin 14 remains at the current floor with the door in an open position until the situation is resolved.

Figure 9:
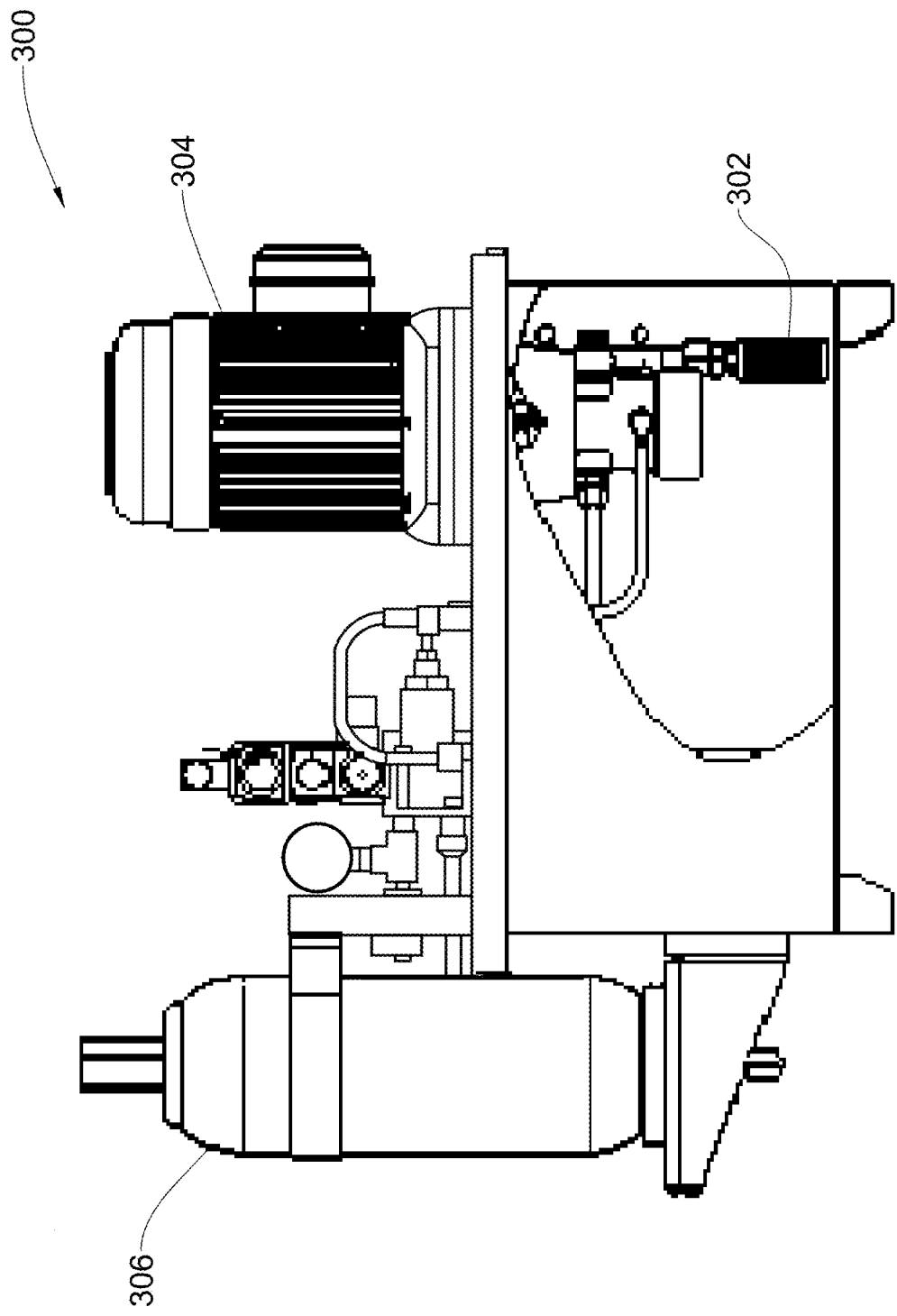
FIG. 9 illustrates an example of a hydraulic power unit for use with the elevator systems illustrated in the above-listed figures.

As illustrated in FIG. 9, the elevator system 10 may comprise a hydraulic power unit, which is generally indicated at 300. The hydraulic power unit 300 may comprise a pump 302, configured to provide the hydraulic fluid to the various components of the elevator system 10, for example as described above, with sufficient hydrostatic pressure for their operation. It further comprises a prime mover 304, such as an electric motor, operationally connected to and configured to provide mechanical power to the pump 302, and may further optionally comprise an energy storage device 306, such as a hydraulic accumulator 306. In operation, the prime mover 304 may be operated using constant power, such that the use of the elevator system 10 does not impact the amount of electricity consumed.

The hydraulic power unit 300 may be configured to utilize energy stored in the energy storage device 306. According to some examples, the prime mover 304 does provide the maximum amount of power that the elevator system 10 requires, e.g., under peak load, but rather is supplemented by the energy storage device 306, in which energy is stored when the elevator system is operating under conditions which require less energy than is provided by the prime mover. Thus, the prime mover 304, and thus the hydraulic power unit 300 and the elevator system 10, may operate with a constant (e.g., electrical) power input, while minimizing the amount of energy which is wasted under variable power conditions. Accordingly, there is provided a method of operating the elevator system 10, for example provided according to any one or more of the examples herein, under a constant electrical power.

It will be appreciated that the hydraulic power unit 300 may be located in any suitable location, e.g., a roof of the building in which the elevator system 10 operates, its basement, one of the floors of the building, etc.

While the elevator system 10 has been described above may be configured to operate autonomously, it will be appreciated that it may be modified in order to allow user input. According to some examples, the cabin-management system 200 may be modified so as to allow, before or after operation in hydraulic mode, that a floor be bypassed, i.e., that the cabin 14 does not stop at a given floor. According to other examples, a calling system may be implemented, allowing a user to summon the cabin 14 to a given floor, such as is allowed in conventional elevators operating non-autonomously.

It will be appreciated that the signaling described hereinabove may be according to any suitable design, including, but not limited to, hydraulic, pneumatic, etc., without departing from the scope of the presently disclosed subject matter, mutatis mutandis.

It will be further appreciated that while certain elements of the present disclosure referred to a hydraulic or pneumatic arrangement, this has been done by way of non-limiting example. For example, elements described herein as pneumatic may be substituted with equivalent hydraulic elements, and vice versa, mutatis mutandis.

Those skilled in the art to which this invention pertains will readily appreciate that numerous changes, variations and modifications can be made without departing from the scope of the invention mutatis mutandis.

The invention claimed is:

1. A cabin-management system for an elevator system, the elevator system comprising at least one cabin and a drive system configured to facilitate travel of said cabin between two or more floors, the cabin-management system being operated using pressurized fluid and configured to autonomously direct operation of the elevator system upon arrival of one of said cabins at a floor, the cabin-management system comprising a floor detector configured to detect when the cabin is located at a floor and a timer configured to be triggered thereby;

said timer being configured, when triggered, to activate a timing arrangement and to pass pressurized fluid to a control valve being in a first position;

said timing arrangement being configured, a predetermined amount of time after being activated, to direct said control valve to assume a second position;

said cabin-management system being configured to perform, when pressurized fluid is passed to said control valve in its first position, one or more actions associated with opening a door to the cabin, and to perform, after said control valve has assumed its second position, one or more actions associated with resumed travel of the cabin.

2. The cabin-management system according to claim 1, being free of any electric components.

3. The cabin-management system according to claim 1, wherein in its first position, the control valve is open, and in its second position, said control valve is closed.

4. The cabin-management system according to claim 1, further comprising an auxiliary control valve configured, in an active position thereof, to pass said pressurized fluid to said control valve and to said timing arrangement, thereby activating it, and in a closed position thereof to prevent pressurized fluid from flowing to said control valve.

5. The cabin-management system according to claim 4, the floor detector being configured to direct said auxiliary control valve to assume said active position, thereby triggering the timer.

6. The cabin-management system according to claim 1, wherein said timing arrangement comprises a pressurized-fluid cylinder configured to extend when the timing element is activated, and a flow control valve configured to regulate the flowrate of pressurized fluid thereto, wherein the flowrate determines said predetermined amount of time.

7. The cabin-management system according to claim 6, wherein said pressurized-fluid cylinder is configured, when fully extended, to activate said control valve to assume its second position.

8. The cabin-management system according to claim 1, wherein said actions associated with opening a door to the cabin comprise one or more selected from a group including applying brakes, deploying a mechanical securing mechanism, and opening said door.

9. The cabin-management system according to claim 8, configured to open said door only after said brakes have been applied and/or said mechanical securing mechanism has been deployed.

10. The cabin-management system according to claim 9, wherein said mechanical securing mechanism is deployed after said brakes have been applied.

11. The cabin-management system according to claim 1, wherein said actions associated with resumed travel of the cabin comprise one or more selected from a group including disengaging brakes, disengaging a mechanical securing mechanism, and closing said door.

12. The cabin-management system according to claim 11, configured to disengage said mechanical securing mechanism and/or disengage said brakes only after said door has been closed.

13. The cabin management system according to claim 12, wherein said brakes are disengaged after said securing mechanism has been disengaged.

14. The cabin-management system according to claim 1, wherein said floor detector is further configured to activate a slowdown system, configured to reduce the speed of the cabin during travel.

15. The cabin-management system according to claim 1, wherein said drive system comprises a pressurized-fluid motor.

16. The cabin-management system according to claim 15, said drive system further comprising an electric motor, and being configured to be selectively operated to utilize one of said pressurized-fluid and electric motors to facilitate travel of the cabin.

17. The cabin-management system according to claim 16, wherein respective output shafts of said pressurized-fluid and electric motors are mechanically coupled to rotate in tandem with one another.

18. The cabin-management system according to claim 1, wherein said pressurized fluid is hydraulic.

19. An elevator system comprising at least one cabin and a drive system configured to facilitate travel of said cabin between two or more floors, the cabin-management system being operated using pressurized fluid and configured to autonomously direct operation of the elevator system upon arrival of one of said cabins at a floor, the elevator system further comprising a cabin-management system comprising a floor detector configured to detect when the cabin is located at a floor and a timer configured to be triggered thereby;

said timer being configured, when triggered, to activate a timing arrangement and to pass pressurized fluid to a control valve being in a first position;

said timing arrangement being configured, a predetermined amount of time after being activated, to direct said control valve to assume a second position;

said cabin-management system being configured to perform, when pressurized fluid is passed to said control valve in its first position, one or more actions associated with opening a door to the cabin, and to perform, after said control valve has assumed its second position, one or more actions associated with resumed travel of the cabin.

* * * * *